United States Patent

Takada

[11] Patent Number: 5,535,042
[45] Date of Patent: Jul. 9, 1996

[54] LIGHT SCANNING DEVICE

[75] Inventor: Norihisa Takada, Kanagawa-ken, Japan

[73] Assignee: Fuji Photo Film Co., Ltd., Kanagawa, Japan

[21] Appl. No.: 261,945

[22] Filed: Jun. 17, 1994

[30] Foreign Application Priority Data

Jun. 17, 1993 [JP] Japan ................................ 5-146544

[51] Int. Cl.$^6$ ........................................... G02B 26/08
[52] U.S. Cl. ..................... 359/212; 359/213; 359/220; 359/319
[58] Field of Search ........................ 359/196, 197, 359/198, 213, 219, 298, 305, 315, 318, 319, 254, 303, 220; 358/493, 491

[56] References Cited

U.S. PATENT DOCUMENTS

| | | | |
|---|---|---|---|
| 3,705,758 | 12/1972 | Haskal | 359/319 |
| 3,736,046 | 5/1973 | Zook | 359/319 |
| 4,829,175 | 5/1989 | Goto et al. | 250/236 |
| 5,033,806 | 7/1991 | Tomita et al. | 347/256 |
| 5,067,798 | 11/1991 | Tomoyasu | 359/305 |
| 5,124,835 | 6/1992 | Shibaguchi et al. | 359/319 |
| 5,289,307 | 2/1994 | Oldersha et al | 359/196 |

FOREIGN PATENT DOCUMENTS

0092825  4/1991  Japan ................................ 359/319

Primary Examiner—Paul M. Dzierzynski
Assistant Examiner—Darren E. Schuberg
Attorney, Agent, or Firm—Sughrue, Mion, Zinn, Macpeak & Seas

[57] ABSTRACT

Corrective signals for canceling out a dynamic deformation of the reflecting surface of a rotary scanning mirror are applied to X and Z electrodes of an electro-optic lens. Based on the supplied corrective signals, the electro-optic lens controls the refractive index of a light-transmissive element to refract a laser beam in a direction to eliminate an excessively converged or diverged condition of the laser beam due to the dynamic deformation of the reflecting surface of the rotary mirror. The spatial vector of the corrective signals supplied to the electro-optic lens rotates in synchronism with the rotation of the rotary scanning mirror. Therefore, the laser beam which passes through the electro-optic lens and is reflected by the reflecting surface forms a beam spot on a film, which stays focused at all times irrespective of the angular displacement of the rotary scanning mirror.

12 Claims, 8 Drawing Sheets

LIGHT SCANNING DEVICE

BACKGROUND OF THE INVENTION

1. Field of the Invention

The present invention relates to a light scanning device which is capable of compensating for a dynamic deformation of the mirror configuration of a driven-mirror light deflector upon high-speed operation thereof.

2. Description of the Related Art

Laser beam printers which deflect a laser beam at high speed to record an image or other information on a scanned medium such as a photographic film or the like are used in a variety of applications. One known light deflector for deflecting such a laser beam is a driven-mirror light deflector having a reflecting surface inclined at about 45° to the direction in which the laser beam is applied to the reflecting surface. The reflecting surface is rotated at high speed to deflect the laser beam to scan the scanned medium.

When the reflecting surface of the driven-mirror light deflector is rotated at high speed, the reflecting surface tends to be deformed due to centrifugal forces, causing the laser beam spot to be shifted out of focus on the scanned medium. As a result, the image which is recorded on the scanned medium using the driven-mirror light deflector is liable to be blurred.

SUMMARY OF THE INVENTION

It is therefore an object of the present invention to provide a light scanning device which converges or diverges a light beam in a manner to cancel out a dynamic deformation or strain of the reflecting mirror of a driven-mirror light deflector, for thereby allowing an image or other information to be recorded or read highly accurately.

To achieve the above object, there is provided in accordance with the present invention a light scanning device comprising light beam generating means for generating a light beam, a driven-mirror light deflector having a reflecting mirror surface for deflecting and leading the light beam generated by the light beam generating means onto a scanned medium, deflecting position detecting means for detecting a deflecting position of the driven-mirror light deflector with respect to the light beam, corrective signal generating means for generating a corrective signal corresponding to a dynamic strain of the reflecting mirror surface which is produced when the driven-mirror light deflector deflects the laser beam, and light beam control means disposed between the light beam generating means and the light deflector for converging or diverging the light beam applied to the reflecting mirror surface to an extent based on the corrective signal in a manner to correspond to the deflecting position of the driven-mirror light deflector.

The light beam is converged or diverged by the light beam control means to an extent corresponding to dynamic strain of the reflecting mirror surface. As a result, the light beam reflected by the reflecting mirror surface is led to the scanned medium after having been compensated for the dynamic strain of the reflecting mirror surface.

Since the light deflector rotates at a high speed while the light beam control means is stationary, the spatial vector supplied to the light beam control means is rotated in synchronism with the rotation of the light deflector to keep the light beam focused on the scanned medium at all times regardless of the scanned position on the scanned medium.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
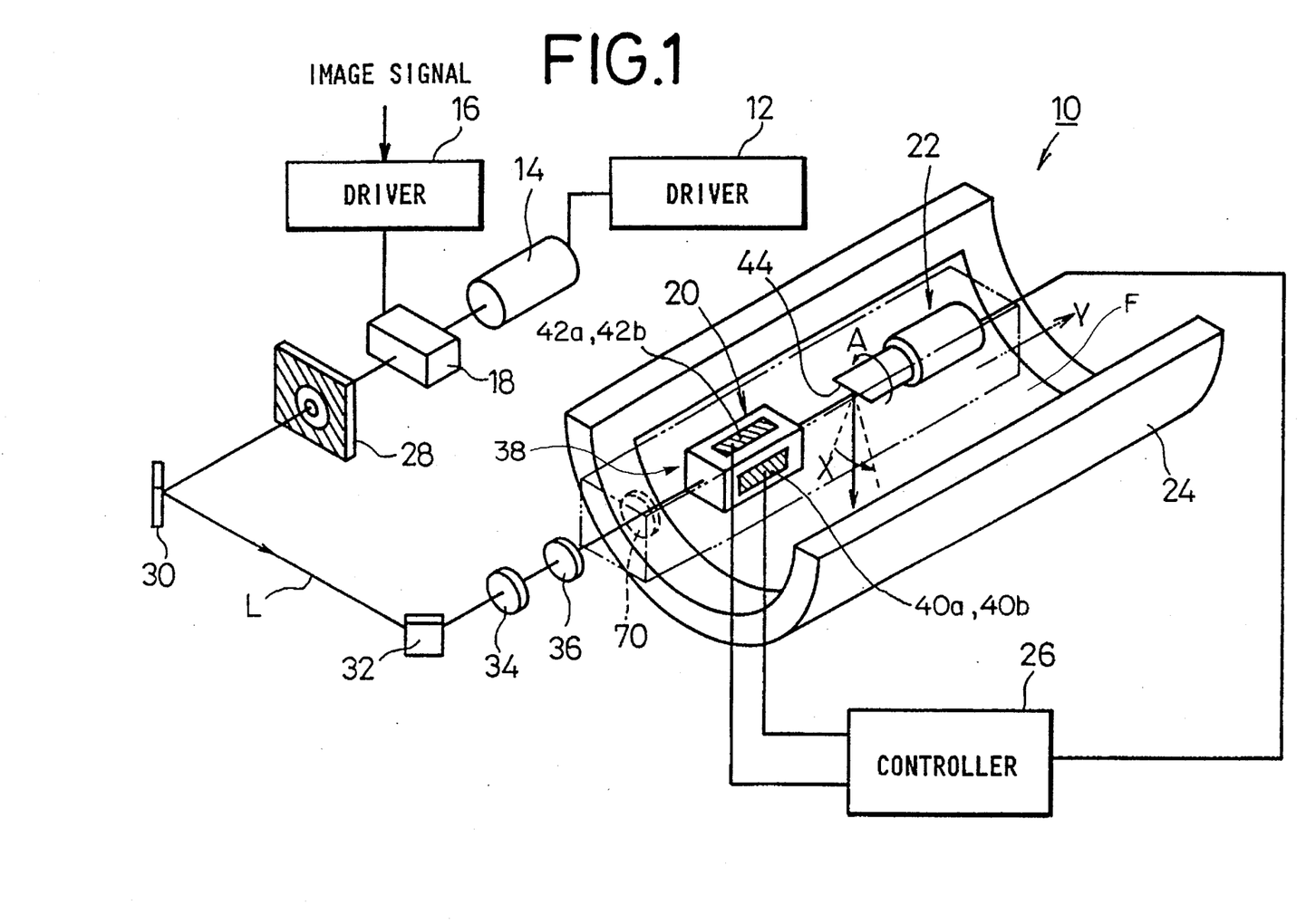
FIG. 1 is a schematic perspective view, partly in block form, of a scanned-cylinder-type image recording apparatus which incorporates a light scanning device according to the present invention.

As shown in FIG. 1, a scanned-cylinder-type image recording apparatus 10 which incorporates a light scanning device according to the present invention operates to record image information on an arcuate recording surface of a sheet-like film F by scanning the arcuate recording surface with a modulated laser beam L.

The scanned-cylinder-type image recording apparatus 10 comprises a laser head oscillator 14 (light beam generating means) comprising a He-Ne laser or the like for emitting a laser beam L, an acousto-optic modulator (AOM) 18 energizable by a driver 16 based on an image signal for modulating the laser beam L, an electro-optic lens 20 (light beam controlling means) for controlling the beam spot shape on the film F of the laser beam L based on a given corrective signal, a rotary scanning mirror 22 (driven-mirror light deflector) for scanning the film F with the laser beam L in a main scanning direction indicated by the arrow X, a semicylindrical support 24 which supports the film F on its inner arcuate surface, and a controller 26 (corrective signal generating means) for generating the corrective signal based on the deflecting position of the rotary scanning mirror 22 and supplying the generated corrective signal to the electro-optic lens 20. The electro-optic lens 20 and the rotary scanning mirror 22 are movable in an auxiliary scanning direction indicated by the arrow Y which is perpendicular to the main scanning direction X (X direction).

A plurality of optical elements are disposed along an optical axis between the AOM 18 and the electro-optic lens 20. Specifically, the AOM 18 is followed successively by an aperture 28 which passes only the laser beam L that is required to record image information, reflecting mirrors 30, 32 which deflect the optical path, and collimator lenses 34, 36 which convert the laser beam L into a parallel beam. The electro-optic lens 20 which follows the collimator lenses 34, 36 comprises a light-transmissive element 38 that utilizes such an electro-optic effect that the refractive index of a medium varies depending on the density of an electric field which is applied thereto. The light-transmissive element 38, which is in the shape of a rectangular parallelepiped, has two opposite surfaces lying perpendicularly to the main scanning direction X and supporting respective X electrodes 40a, 40b, and two opposite surfaces lying parallel to the main and auxiliary scanning directions X, Y and supporting respective Z electrodes 42a, 42b. The rotary scanning mirror 22 has a reflecting surface 44 rotatable in the direction indicated by the arrow A about an axis parallel to the auxiliary scanning direction Y (Y direction). The reflecting surface 44 is inclined at about 45° to the direction in which the laser beam L is applied thereto.

Figure 2:
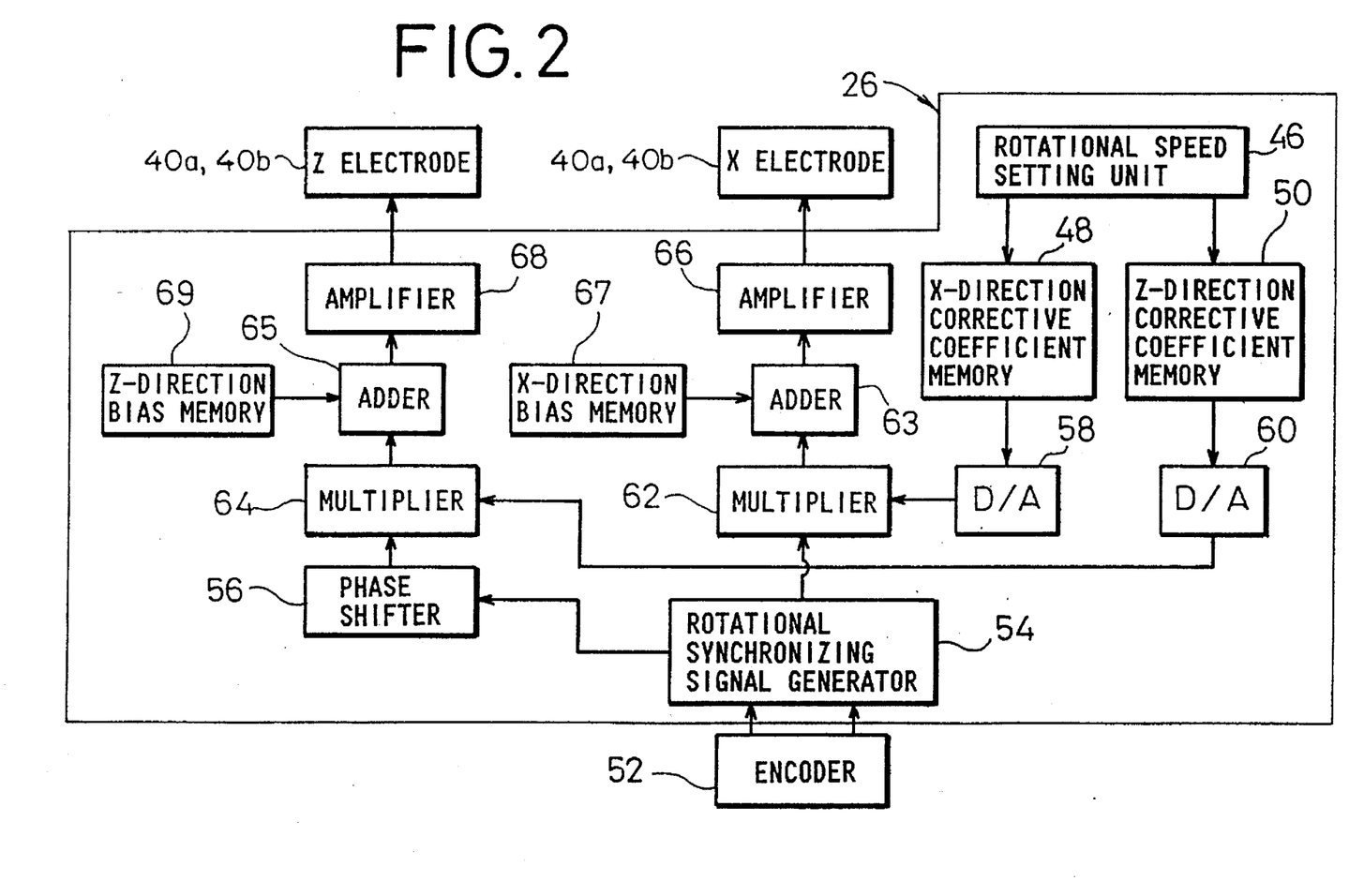
FIG. 2 is a detailed block diagram of a controller in the scanned-cylinder-type image recording apparatus shown in FIG. 1.

As shown in FIG. 2, the controller 26 comprises a rotational speed setting unit 46 for setting a rotational speed for the rotary scanning mirror 22, an X-direction corrective coefficient memory 48 for storing a corrective coefficient which corrects a converging or diverging quantity in the main scanning direction X of the laser beam L applied to the reflecting surface 44, a Z-direction corrective coefficient memory 50 for storing a corrective coefficient which corrects a converging or diverging quantity in a Z direction (perpendicular to both the X and Y directions) of the laser beam L, an encoder 52 (deflecting position detecting means) mounted on the rotary scanning mirror 22 for detecting the deflecting position of the rotary scanning mirror 22, a rotational synchronizing signal generator 54 for generating a rotational synchronizing signal based on the deflecting position detected by the encoder 52, and a phase shifter 56 for shifting the phase of the rotational synchronizing signal by 90°. Based on the rotational speed which is set, the rotational speed setting unit 46 selects certain corrective coefficients from the X-direction corrective coefficient memory 48 and the Z-direction corrective coefficient memory 50, and the selected corrective coefficients are outputted to respective digital-to-analog (D/A) converters 58, 60. The D/A converters 58, 60 convert the supplied corrective coefficients to analog signals, which are outputted to respective multipliers 62, 64. The multiplier 62 multiplies a rotational synchronizing signal $\sin^2\theta$ from the rotational synchronizing signal generator 54 by the analog signal from the D/A converter 58, and the multiplier 64 multiplies a rotational synchronizing signal $\cos^2\theta$, which has been shifted in phase by 90° from the rotational synchronizing signal $\sin^2\theta$ by the phase shifter 56, by the analog signal from the D/A converter 60. The product signals from the multipliers 62, 64 are outputted through respective adders 63, 65 to amplifiers 66, 68, respectively. The adders 63, 65 add, to the product signals from the multipliers 62, 64, respective X- and Z-direction bias signals for adjusting the beam spot diameter of the laser beam L on the film F which have been selected from X- and Z-direction bias memories 67, 69 by the rotational speed setting unit 46. The amplifiers 66, 68 supply corrective signals for generating a certain electric field in the electro-optic lens 20 to control the beam spot diameter of the laser beam L to the X electrodes 40a, 40b and the Z electrodes 42a, 42b.

Operation and advantages of the cylindrical-scanning-type image recording apparatus 10 thus constructed will be described below.

First, a mode of operation in which no laser beam convergence or divergence is corrected by the electro-optic lens 20 will be described below.

The laser head oscillator 14 is energized by the driver 12 to emit a laser beam L, which is modulated by the AOM 18 that is controlled by the driver 16 based on an image signal representing an image to be recorded on the film F. The modulated laser beam L travels through the aperture 28 and is deflected by the reflecting mirrors 30, 32, after which the laser beam is collimated by the collimator lenses 34, 36 and then the laser beam L reaches the electro-optic lens 20. The laser beam L that has passed through the electro-optic lens 20 is reflected and deflected by the reflecting surface 44 of the rotary scanning mirror 22 which rotates in the direction A, and is then applied to the film F. At this time, the laser beam L scans the film F in the main scanning direction X since the rotary scanning mirror 22 rotates, and the rotary scanning mirror 22 and the electro-optic lens 20 move in the auxiliary scanning direction Y. Consequently, the laser beam L scans the film F two-dimensionally, thereby recording a desired two-dimensional image on the film F.

Figure 3:
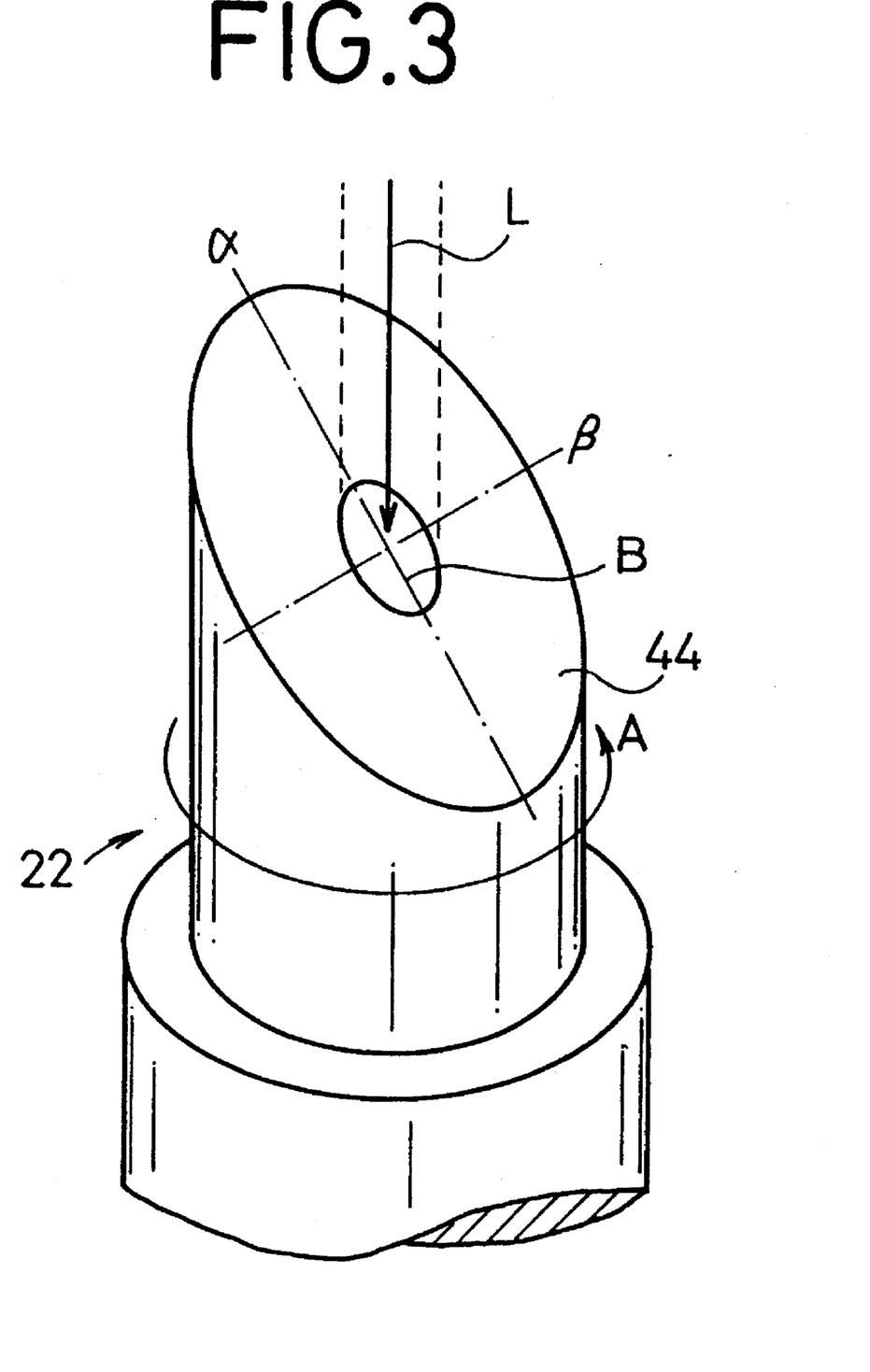
FIG. 3 is an enlarged fragmentary perspective view of a rotary scanning mirror in the scanned-cylinder-type image recording apparatus shown in FIG. 1.
Figure 4A:
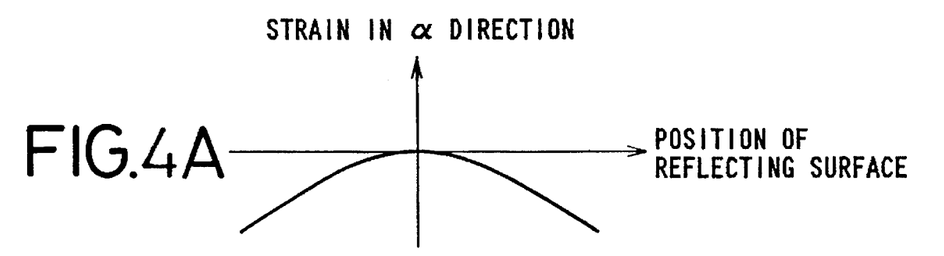
FIGS. 4A and 4B are diagrams illustrative of how the reflecting surface of the rotary scanning mirror shown in FIG. 3 is strained when it operates.
Figure 4B:
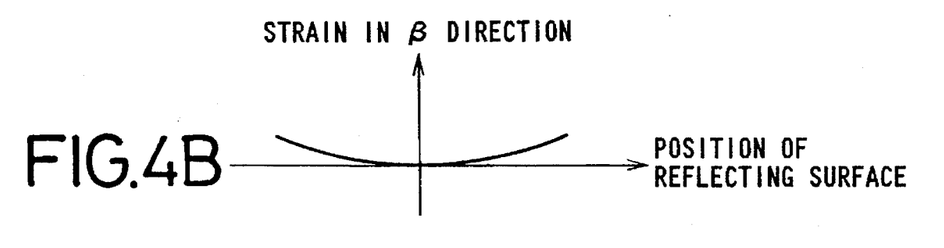

The reflecting surface 44 of the rotary scanning mirror 22 is deformed or strained under centrifugal forces which are produced when it rotates at a high speed. More specifically, as shown in FIG. 3, when the rotary scanning mirror 22 rotates in the direction A, the reflecting surface 44 is deformed convexly in a longitudinal direction α thereof as shown in FIG. 4A. As the reflecting surface 44 is deformed convexly in the longitudinal direction α, it is deformed concavely in a transverse direction β normal to the longitudinal direction α, as shown in FIG. 4B. Therefore, if the laser beam L were applied to the film F without laser beam convergence or divergence correction, then the beam spot of the laser beam L on the film F would be varied due to the deformation of the reflecting surface 44, causing any recorded image to blur.

Figure 5A:
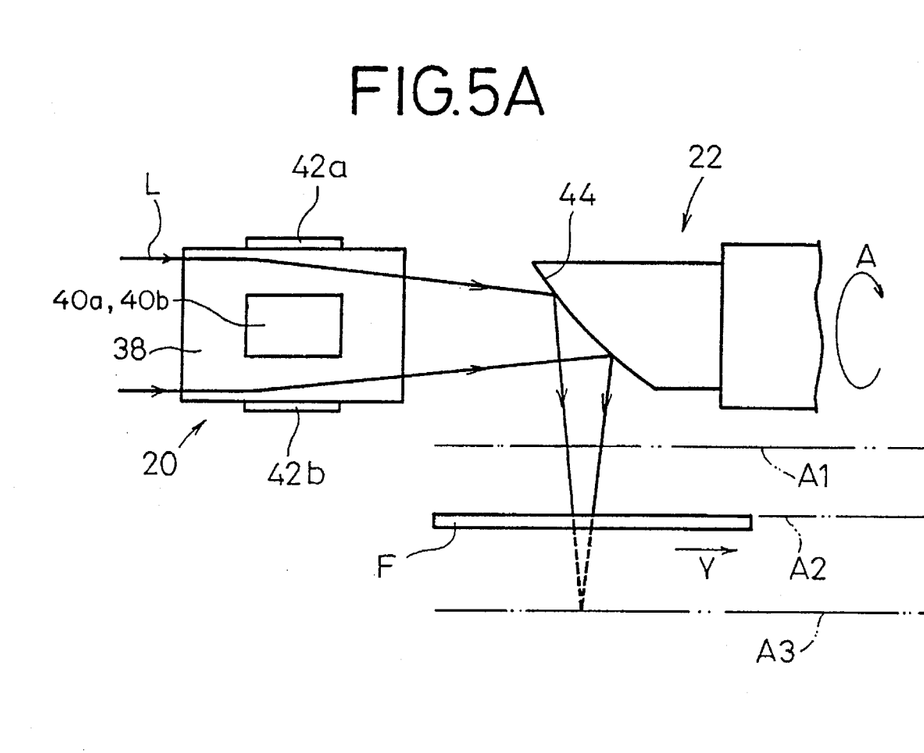
FIGS. 5A and 5B are views showing the focused positions in auxiliary and main scanning directions of a laser beam focused by the rotary scanning mirror shown in FIG. 3.
Figure 5B:
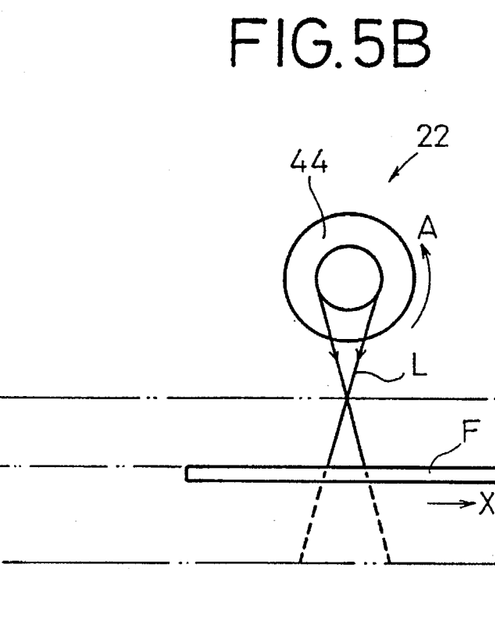
Figure 6A:
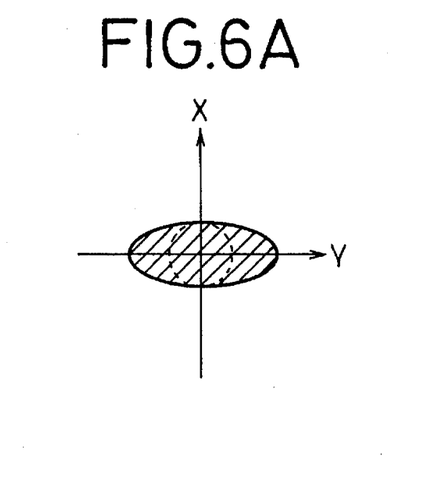
FIGS. 6A, 6B, and 6C are views showing the shapes of laser beam spots at cross sections A1, A2, A3, respectively, in FIGS. 5A and 5B.
Figure 6B:
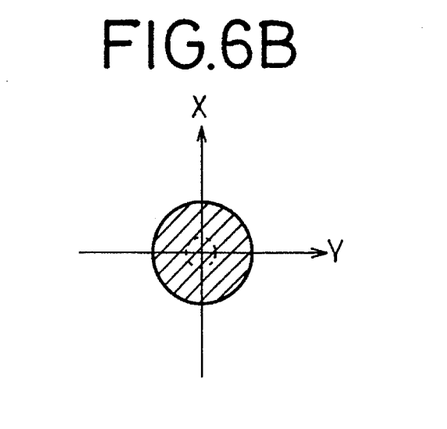
Figure 6C:
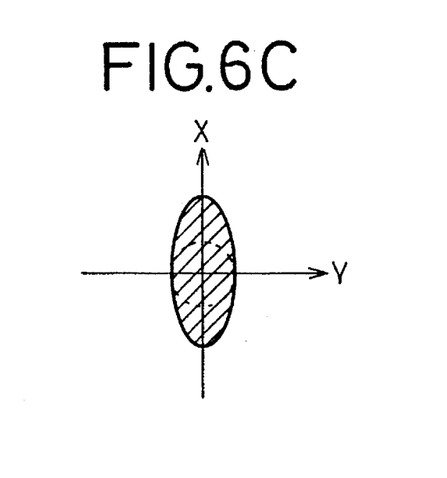

For example, when a convergent laser beam L is reflected by the reflecting surface 44 and applied to the film F, the laser beam L diverges and focuses behind the film F in the auxiliary scanning direction Y as shown in FIG. 5A, and converges and focuses in front of the film F in the main scanning direction X as shown in FIG. 5B. Therefore, the shape of the beam spot of the laser beam L is elongate in the auxiliary scanning direction Y in a cross section A1 in front of the film F as shown in FIG. 6A, is enlarged as a whole in a cross section A2 on the film as shown in FIG. 6B, and is elongate in the main scanning direction X in a cross section A3 behind the film F as shown in FIG. 6C. In each of FIGS. 6A through 6C, a circle indicated by the dotted line represents the shape of a beam spot which would be produced if the reflecting surface 44 were not deformed or strained. As described above, when the reflecting surface 44 is deformed or strained, the laser beam L is subjected to astigmatism.

According to the present invention, the laser beam L applied to the rotary scanning mirror 22 is controlled by the electro-optic lens 20 to produce a desired laser beam spot on the film F. Specifically, as shown in FIGS. 5A and 5B, the laser beam L is converged in the longitudinal direction α of the reflecting surface 44 of the rotary scanning mirror 22, and diverged in the transverse direction β thereof for thereby constricting the beam spot on the film F to the dotted-line configuration in FIG. 6B to focus desirably on the film F. In order to keep the laser beam spot focused on the film F at all times irrespective of the deflecting position of the reflecting surface 44, the converging and diverging quantities of the laser beam L reflected by the reflecting surface 44 in respective directions α, β may be kept constant irrespective of the deflecting position of the reflecting surface 44.

The electro-optic lens 20 can vary the refractive index distribution in the X direction of the light-transmissive element 38 by applying a voltage between the X electrodes 40a, 40b. Similarly, the refractive index distribution in the Z direction of the light-transmissive element 38 can be varied by applying a voltage between the Z electrodes 42a, 42b. The laser beam L which passes through the light-transmissive element 38 is refracted as shown in FIG. 5A by an electric field generated by the applied voltage, and then applied to the reflecting surface 44 of the rotary scanning mirror 22.

Now assume that the rotary scanning mirror 22 is held at rest with the reflecting surface 44 having the strain produced upon high-speed rotation thereof and that the refractive index of the electro-optic lens 20 is isotropic in both the X and Y directions. To correct the focused position on the cross section A3 into the focused position on the cross section A2 in the auxiliary scanning direction Y as shown in FIG. 5A, equal voltages Vx=Vz=Vo are applied between the X electrodes 40a, 40b and between the Z electrodes 42a, 42b of the electro-optic lens 20. When these voltages are applied, the focused position on the cross section A1 in the main scanning direction X as shown in FIG. 5B is moved upwardly, i.e., toward the rotary scanning mirror 22. To correct this focused position in the main scanning direction X into the focused position on the cross section A2, the voltage Vx applied between the X electrodes 40a, 40b is set to a voltage Vo+k. As a result, when the voltages Vx, Vz applied between the X electrodes 40a, 40b and between the Z electrodes 42a, 42b are set to:

$$Vx = Vo + k \quad (1), \text{ and}$$

$$Vz = Vo \quad (2),$$

the beam spot of the laser beam L can be brought into focus on the film F in FIGS. 5A and 5B. Actually, however, the rotary scanning mirror 22 is rotating at a high speed and the electro-optic lens 20 is stationary with respect to the rotary scanning mirror 22. Therefore, it is necessary to rotate the vector formed by the voltages Vx, Vz in synchronism with the rotation of the rotary scanning mirror 22.

When the electro-optic lens 20 is rotated θ=90° from the position shown in FIGS. 5A and 5B, the beam spot of the laser beam L can be focused on the film F by setting the voltages Vx, Vz applied between the X electrodes 40a, 40b and between the Z electrodes 42a, 42b are set to:

$$Vx = Vo \quad (3), \text{ and}$$

$$Vz = Vo + k \quad (4).$$

While the rotary scanning mirror 22 is rotating, therefore, the laser beam spot can be approximately focused on the film F in the main and auxiliary scanning directions X, Y by setting the voltages Vx, Vz to:

$$Vx = Vo + k \cdot \sin^2\theta \quad (5), \text{ and}$$

$$Vz = Vo + k \cdot \cos^2\theta \quad (6)$$

based on the equations (1)–(4).

The equations (5), (6) can be generalized into respective equations (7), (8), given below, so that they are applicable to instances where the refractive index of the electro-optic lens 20 is not isotropic:

$$Vx = Vxo + kx \cdot \sin^2\theta \quad (7), \text{ and}$$

$$Vz = Vzo + kz \cdot \cos^2\theta \quad (8)$$

where kx, kz are corrective coefficients stored in the X- and Z-direction corrective coefficient memories 48, 50, and Vxo, Vzo are X- and Z-direction bias voltages stored in the X- and Z-direction bias memories 67, 69.

Figure 7:
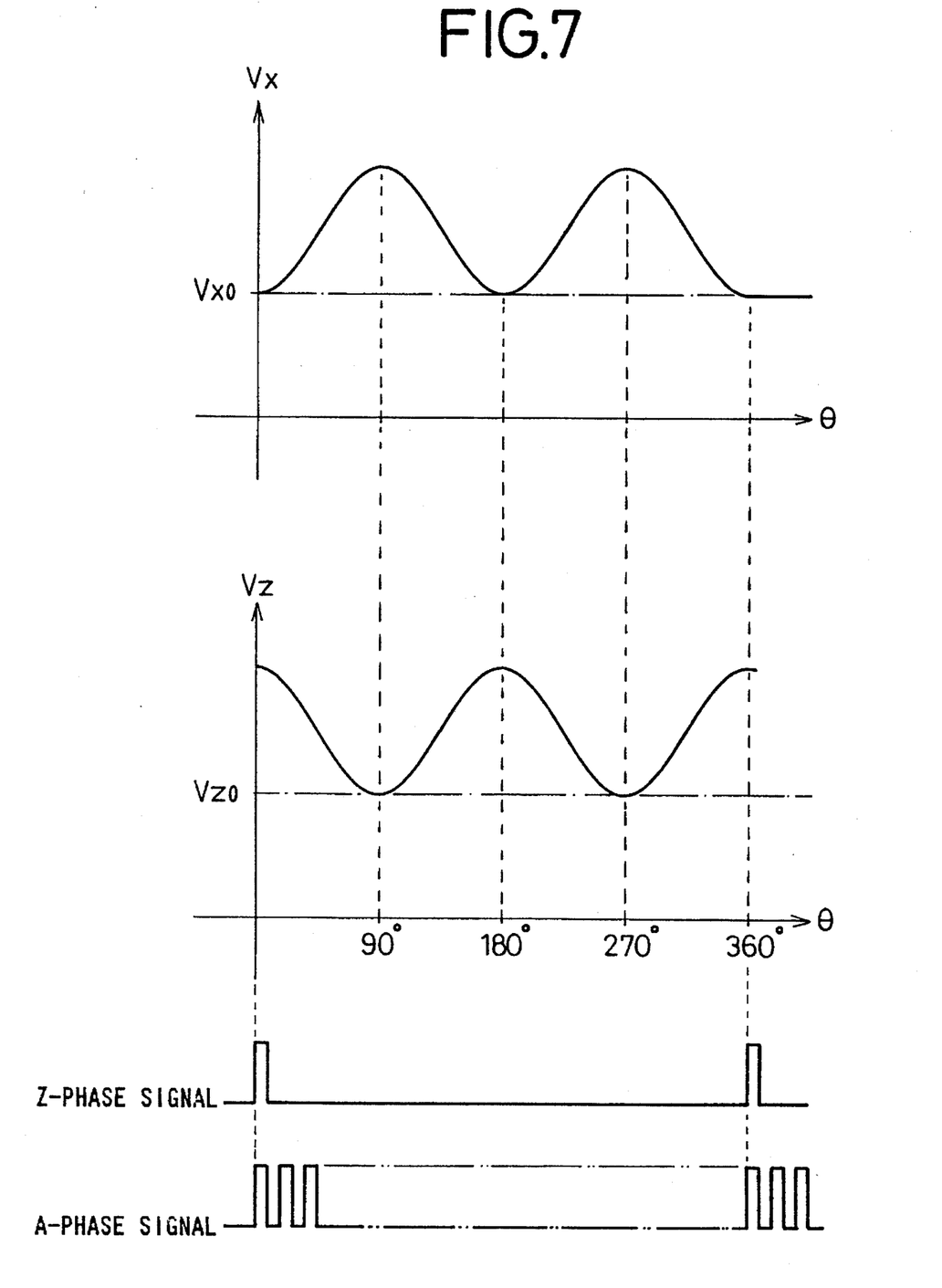
FIG. 7 is a timing chart showing the relationship between drive signals generated by the controller shown in FIG. 2 and detected signals from an encoder mounted on the rotary scanning mirror.

A process of controlling the beam spot of the laser beam L will be described below with reference to FIGS. 2 and 7.

A desired rotational speed for the rotary scanning mirror 22, which corresponds to a main scanning speed, is set by the rotational speed setting unit 46. Then, based on the set rotational speed, the rotational speed setting unit 46 selects corresponding corrective coefficients kx, kz from the X- and Z-direction corrective coefficient memories 48, 50, and the selected corrective coefficients kx, kz are supplied to the respective D/A converters 58, 60. The supplied corrective coefficients kx, kz are converted by the respective D/A converters 58, 60 into analog signals which are supplied to the respective multipliers 62, 64. The encoder 52 mounted on the rotary scanning mirror 22 supplies a Z-phase signal corresponding to the deflecting position θ=0°, 360°, . . . of the reflecting surface 44 and an A-phase signal corresponding to the deflecting position in the range of 0°≦θ≦360° to the rotational synchronizing signal generator 54. The rotational synchronizing signal generator 4 generates a rotational synchronizing signal $\sin^2\theta$ corresponding to the deflecting angle θ of the reflecting surface 44 based on the A-phase signal, using the Z-phase signal as a trigger signal, and supplies the generated rotational synchronizing signal $\sin^2\theta$ to the multiplier 62 and the phase shifter 56. The phase shifter 56 shifts the phase of the rotational synchronizing signal $\sin^2\theta$ by 90°, and supplies the phase-shifted rotational synchronizing signal $\sin^2\theta$ to the multiplier 64. The multipliers 62, 64 multiply the rotational synchronizing signal $\sin^2\theta$ and the phase-shifted rotational synchronizing signal $\sin^2\theta$ to the multiplier 64 respectively by the analog corrective coefficients kx, kz, and apply respective product signals to the adders 63, 65. The adders 63, 65 add the X- and Z-direction bias voltages Vxo, Vzo supplied from the X- and Z-direction bias memories 67, 69 respectively to the product signals from the multipliers 62, 64. The sum signals produced by the adders 63, 65 are amplified respectively by the amplifiers 66, 68 into the voltages Vx, Vz indicated by the respective equations (7), (8). The voltages Vx, Vz are then applied between the X electrodes 40a, 40b and between the Z electrodes 42a, 42b. The X- and Z-direction bias voltages Vxo, Vzo supplied to the adders 63, 65 are selected depending on the rotational speed set by the rotational speed setting unit 46.

The electro-optic lens 20 controls the refractive index of the light-transmissive element 38 based on the X- and Z-direction bias voltages Vxo, Vzo to lead the laser beam L onto the reflecting surface 44 of the rotary scanning mirror 22, which then leads the laser beam L onto the film F. The laser beam L is focused as a beam spot, which is shaped as indicated by the dotted line in FIG. 5B, on the film F irrespective of the deflecting angle θ of the reflecting surface 44. As a consequence, a desired image which is not blurred is recorded on the film F.

In FIG. 1, a condensing lens 70 may be disposed between the collimator lens 36 and the electro-optic lens 20 for adjusting the amount of convergence of the laser beam L before the laser beam L is applied to the electro-optic lens 20. The condensing lens 70 thus allows the ranges of the bias voltages Vx, Vz and the corrective coefficients kx, kz to be adjusted.

Figure 8:
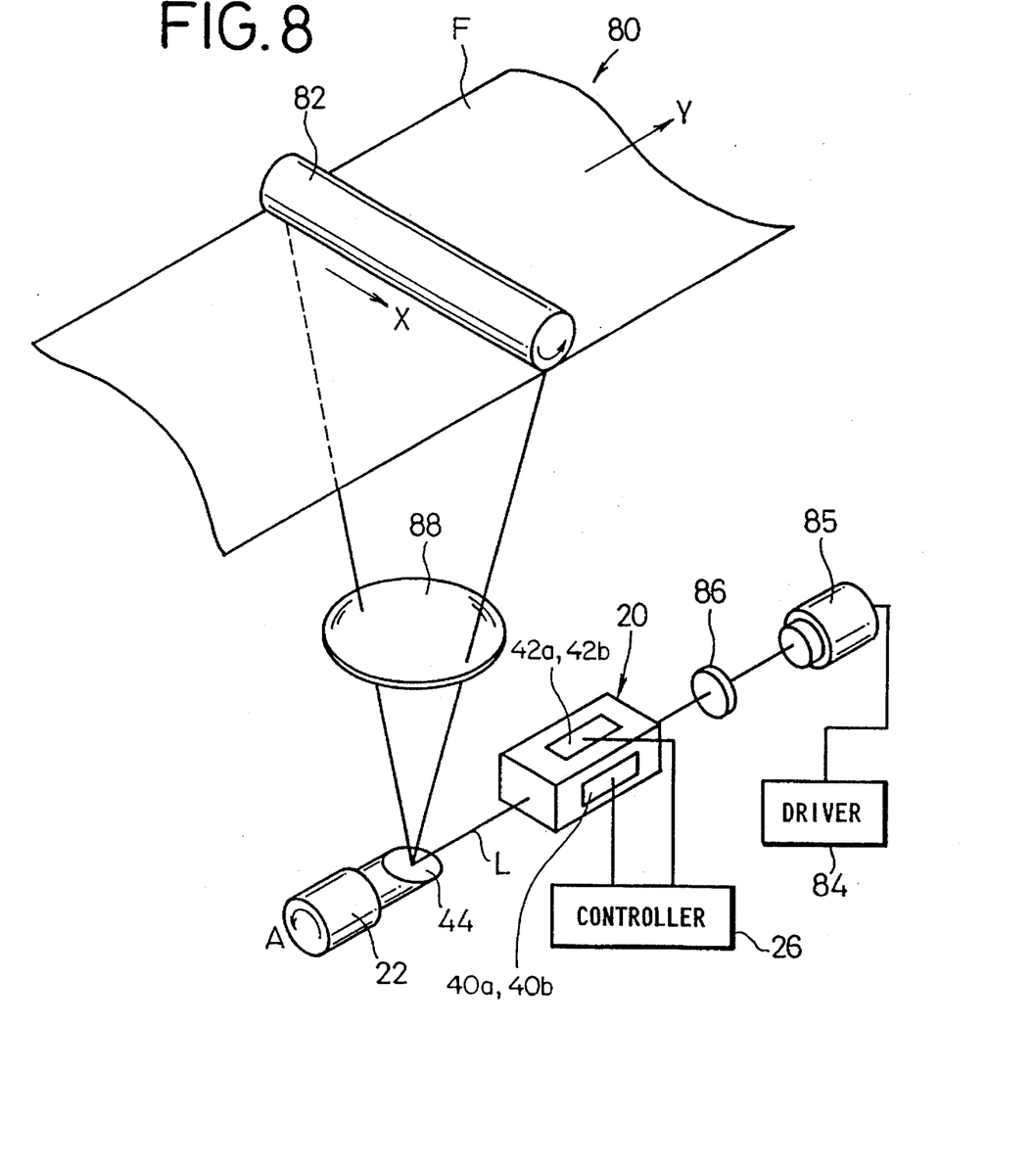
FIG. 8 is a schematic perspective view, partly in block form, of a planar-scanning-type image recording apparatus which incorporates a light scanning device according to the present invention.

In the above embodiment, the light scanning device according to the present invention is incorporated in the cylindrical-scanning-type image recording apparatus. However, the principles of the present invention are also applicable to a planar-scanning-type image recording apparatus 80 as shown in FIG. 8. In the planar-scanning-type image recording apparatus 80, a film F is fed by a platen roller 82 in an auxiliary scanning direction indicated by the arrow Y. A laser beam L which has been emitted from a laser diode 85 and intensity-modulated by a driver 84 based on an image signal is applied through a collimator lens 86 to an electro-optic lens 20. The electro-optic lens 20 controls its refractive index with respect to the laser beam L, and applies the laser beam L to a rotary scanning mirror 22. The rotary scanning mirror 22 reflects and deflects the laser beam L, which passes through a scanning lens 88 such as an fθ lens or the like and scans the film F in a main scanning direction indicated by the arrow X. In this manner, an image represented by the image signal is recorded two-dimensionally on the film F.

The principles of the present invention can also be employed to compensate for deformations or strains of the reflecting surface of a vibratory-mirror light scanning device such as a galvanometer mirror, a resonant scanner, or the like in a light scanning device.

Although certain preferred embodiments of the present invention has been shown and described in detail, it should be understood that various changes and modifications may be made therein without departing from the scope of the appended claims.

What is claimed is:

1. A light scanning device comprising:

light beam generating means for generating a light beam;

a driven-mirror light deflector having a high speed rotating reflecting mirror surface for deflecting and leading the light beam generated by said light beam generating means onto a scanned medium;

deflecting position detecting means for detecting a rotational position of the reflecting mirror surface of said driven-mirror light deflector;

corrective signal generating means for generating corrective signals which compensate for a dynamic deformation of the reflecting mirror surface; and light beam control means disposed between said light beam generating means and said light deflector for converging in the direction along one axis of said reflecting mirror surface and diverging in the direction along the other axis of said reflecting mirror surface the light beam applied to said reflecting mirror surface based on said corrective signals;

wherein the deformation of the reflecting mirror surface is produced by the high-speed rotation of said reflecting mirror surface.

2. A light scanning device according to claim 1, wherein said reflecting mirror surface is inclined at about 45 degrees with respect to the rotating axis of said reflecting mirror surface.

3. A light scanning device according to claim 1, wherein said corrective signals form a spatial vector which rotates in synchronism with the rotation of said reflecting mirror surface.

4. A light scanning device comprising:

light beam generating means for generating a light beam;

a driven-mirror light deflector having a high speed oscillating reflecting mirror surface for deflecting and leading the light beam generated by said light beam generating means onto a scanned medium;

deflecting position detecting means for detecting a rotational position of the reflecting mirror surface of said driven-mirror light deflector;

corrective signal generating means for generating corrective signals which compensate for a dynamic deformation of the reflecting mirror surface; and light beam control means disposed between said light beam generating means and said light deflector for converging in the direction along one axis of said reflecting mirror surface and diverging in the direction along the other axis of said reflecting mirror surface the light beam applied to said reflecting mirror surface based on said corrective signals;

wherein the deformation of the reflecting mirror surface is produced by the high-speed oscillation of said reflecting mirror surface.

5. A light scanning device according to claim 4, wherein said reflecting mirror surface is inclined at about 45 degrees with respect to the rotating axis of said reflecting mirror surface.

6. A light scanning device according to claim 4, wherein said corrective signals form a spatial vector which oscillates in synchronism with the oscillation of said reflecting mirror surface.

7. A method for compensating for the dynamic deformation of a driven-light mirror having a high speed rotating reflecting mirror surface in a light scanning device comprising the steps of:

generating a light beam;

deflecting and leading the light beam onto a scanned medium using said driven-light mirror;

detecting a rotational position of the reflecting mirror surface of said driven-mirror light deflector;

generating corrective signals which compensate for a dynamic deformation of the reflecting mirror surface; and converging in the direction along one axis of said reflecting mirror surface the light beam applied to said reflecting mirror surface based on said corrective signals; and diverging in the direction along the other axis of said reflecting mirror surface the light beam applied to said reflecting mirror surface based on said corrective signals;

wherein the deformation of the reflecting mirror surface is produced by the high-speed rotation of said reflecting mirror surface.

8. The method for compensating for the dynamic deformation of a driven-light mirror according to claim 7, wherein said reflecting mirror surface is inclined at about 45 degrees with respect to the rotating axis of said reflecting mirror surface.

9. The method for compensating for the dynamic deformation of a driven-light mirror according to claim 7, wherein said corrective signals form a spatial vector which rotates in synchronism with the rotation of said reflecting mirror surface.

10. A method for compensating for the dynamic deformation of a driven-light mirror having a high speed oscillating reflecting mirror surface in a light scanning device comprising the steps of:

generating a light beam;

deflecting and leading the light beam onto a scanned medium using said driven-light mirror;

detecting a rotational position of the reflecting mirror surface of said driven-mirror light deflector;

generating corrective signals which compensate for a dynamic deformation of the reflecting mirror surface; and converging in the direction along one axis of said reflecting mirror surface the light beam applied to said reflecting mirror surface based on said corrective signals; and diverging in the direction along the other axis of said reflecting mirror surface the light beam applied to said reflecting mirror surface based on said corrective signals;

wherein the deformation of the reflecting mirror surface is produced by the high-speed oscillation of said reflecting mirror surface.

11. The method for compensating for the dynamic deformation of a driven-light mirror according to claim 10, wherein said reflecting mirror surface is inclined at about 45 degrees with respect to the rotating axis of said reflecting mirror surface.

12. The method for compensating for the dynamic deformation of a driven-light mirror according to claim 10, wherein said corrective signals form a spatial vector which oscillates in synchronism with the oscillation of said reflecting mirror surface.

* * * * *